G. T. COPELAND.
FISHING-LINE REELS.
No. 195,578. Patented Sept. 25, 1877.
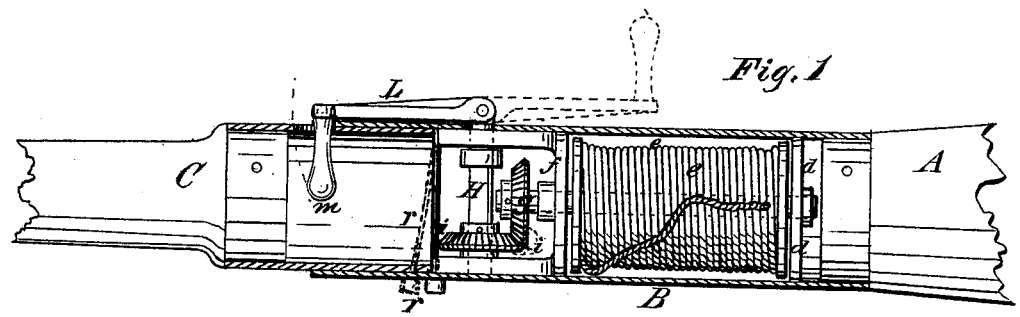
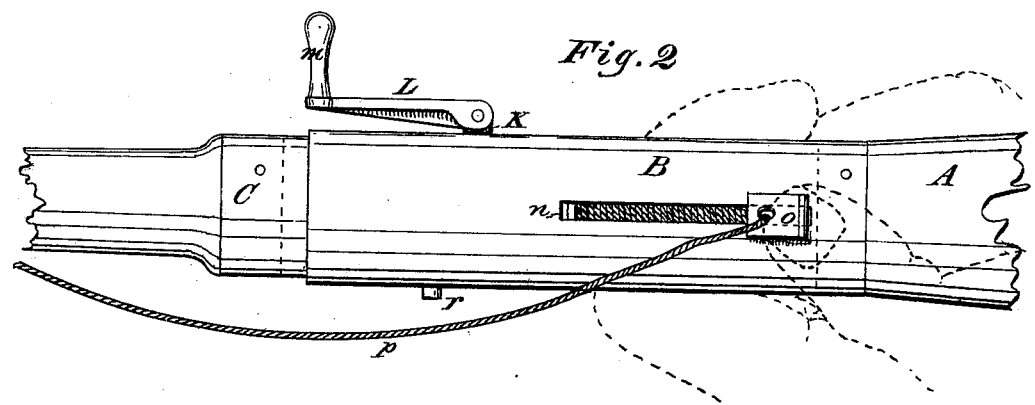
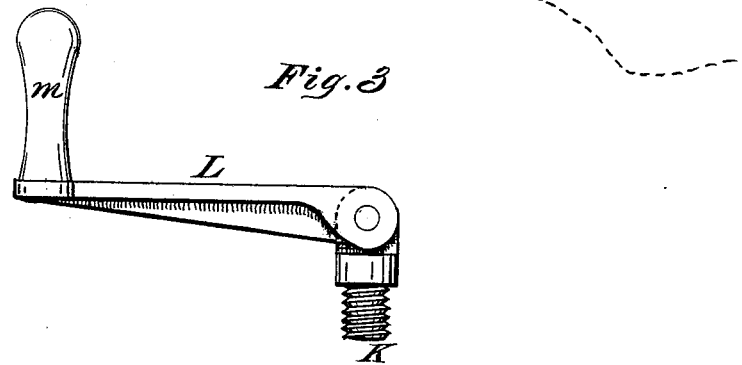
Witnesses:
F. S. Copeland
John Bard
Inventor,
George T. Copeland,
By J. W. Latcher,
Atty

UNITED STATES PATENT OFFICE.

GEORGE T. COPELAND, OF BRATTLEBOROUGH, VERMONT.

IMPROVEMENT IN FISHING-LINE REELS.

Specification forming part of Letters Patent No. 195,578, dated September 25, 1877; application filed November 21, 1876.

*To all whom it may concern:*

Be it known that I, GEORGE TROWBRIDGE COPELAND, of Brattleborough, in the county of Windham, State of Vermont, have invented a Fishing-Line Reel, of which the following is a specification:

This invention relates to improvements in fishing-line reels; and consists in the construction and arrangement of the various parts of such reels, as hereinafter set forth and claimed.

To enable others skilled in the art to fully understand and construct the same, I will proceed to describe it as follows:

Figure 1 is a partial longitudinal sectional view of my invention, representing the pivoted crank. Fig. 2 is a longitudinal elevation of the same, representing in dotted lines the thumb of the angler resting on the fishing-line guide. Fig. 3 is a side elevation of the pivoted crank and the detachable shaft which actuates the reel.

A represents the butt of the fishing-rod; B, the reel case or frame which unites the butt A with the remaining portion of the rod C.

The portion C may enter or join the case B, as represented in Figs. 1 and 2, which is believed to answer every requirement.

The reel-case B may be formed with appropriate openings for drying the line on the spool in the usual way; or the butt A may be readily removed for a like purpose.

The reel-case B may be made of any suitable metal tubing, brass being preferred, however.

The bearing $d$ may be affixed to the butt B, in order to readily detach the reel portion therefrom, and also increase the diameter of the spool $e$ of the reel, which would render the same much smaller were the bearings $d$ and $f$ connected together within the reel-case B. This, however, is unimportant, as the spool $e$ may be extended any length required without increasing its diameter, in order that the necessary amount of fishing-line may be wound thereon.

The bearing-frame $f$ is fitted to receive the reel-shaft $g$ and crank-shaft H, the said shafts being provided with bevel-gears $i$ $i$, as shown in Fig. 1. The frame $f$ is fitted to slide closely in the reel-case B, and a suitable hole is made through the case B in order to receive the screw-shaft K, the end of the shaft H not being extended beyond the outer surface of the frame $f$, in order that the frame $f$, reel-spool $e$, and their appendages may be readily withdrawn whenever desired.

The crank L is pivoted to the detachable screw-shaft K, as shown in the drawing, and a suitable opening in the proper place is made through the reel-case, in order that the crank-pin $m$ may be inserted therein when the crank is reversed, as shown in Fig. 1. This will prevent the crank or any portion of the reel coming in contact with obstructions incident to angling, the reel-case B answering as a portion of the rod, as will be seen by reference to Figs. 1 and 2.

A longitudinal slot, $n$, is made through the reel-case B directly over the spool $e$, as shown in Fig. 2. A line-guide or distributer, $o$, is held in place to slide loosely in the slot $n$ by means of a dovetail lug underneath. A hole is also formed, through which the line $p$ passes, as shown in Fig. 2, the thumb of the angler manipulating the same, as will be inferred by reference to the drawing, Fig. 2.

A spring-brake, $r$, is arranged transversely within the case B, and projects through a notched slot in the side of the case opposite to the crank L, where it terminates in a knob, by means of which the brake may be made to engage with the gear $i$, when desired, for the purpose of checking its motion, and thus moderate the run of the line in winding or unwinding it.

Having thus described my invention, what I claim as new, and desire to secure by Letters Patent, is—

The improved fishing-line reel herein described, consisting of the spool $e$ and shaft $g$, the shafts H K, bevel-gears $i$ $i$, spring-brake $r$, pivoted crank L, and case B, having slot $n$ and guide $o$, as set forth.

GEORGE T. COPELAND.

Witnesses:
MARY A. SPRAGUE,
WILLIAM S. NEWTON.